United States Patent [19]

Ruth

[11] 4,418,460
[45] Dec. 6, 1983

[54] METHOD AND APPARATUS FOR SEPARATING A LID FROM A CONTAINER

[76] Inventor: Charles N. Ruth, 2414 Sandridge Ct., Grand Junction, Colo. 81503

[21] Appl. No.: 291,985

[22] Filed: Aug. 11, 1981

[51] Int. Cl.³ .......................................... B23Q 17/00
[52] U.S. Cl. .............................. 29/403.3; 29/426.3; 29/426.4; 29/426.5; 29/801; 81/3.2; 100/902
[58] Field of Search ............... 29/403.3, 426.4, 426.5, 29/244, 773, 776, 403.1, 403.2, 801, 798, 402.03; 81/3.2; 100/902; 413/78; 225/93, 95, 104

[56] References Cited

U.S. PATENT DOCUMENTS

| | | | |
|---|---|---|---|
| 2,496,672 | 2/1950 | Newman | 29/426.4 |
| 3,477,597 | 11/1969 | Benner, Sr. | 29/426.4 |
| 3,618,429 | 9/1969 | Froeliger . | |
| 3,736,896 | 6/1973 | Osborn, Jr. et al. . | |

FOREIGN PATENT DOCUMENTS 143644 11/1902 Fed. Rep. of Germany ........ 413/78

*Primary Examiner*—Francis S. Husar
*Assistant Examiner*—David B. Jones

[57] ABSTRACT

A multi-metal container separating apparatus is provided for orienting, delidding and compacting containers. The apparatus includes an orienting unit which orients the lids of the containers in a predetermined direction. After orientation, the containers are fed to a delidding unit. The delidding unit includes a clamping assembly for gripping each container during the delidding process in which one end is removed from each container. While each container is held fixed in position, a piercing element is extended from within a moving plunger body to penetrate an end of the container. The piercing element is then retracted within the plunger body. Movement of the plunger body continues through the body of the container and the plunger body engages the other end of the container. The force of the plunger body in a direction inwardly to outwardly of the container removes this end of the container. The delidded container falls to a pivotable support platform. A compacting plate is fastened to the support platform and forms part of a compacting unit wherein the delidded container is flattened between the compacting plate and a wall of the compacting unit.

12 Claims, 9 Drawing Figures

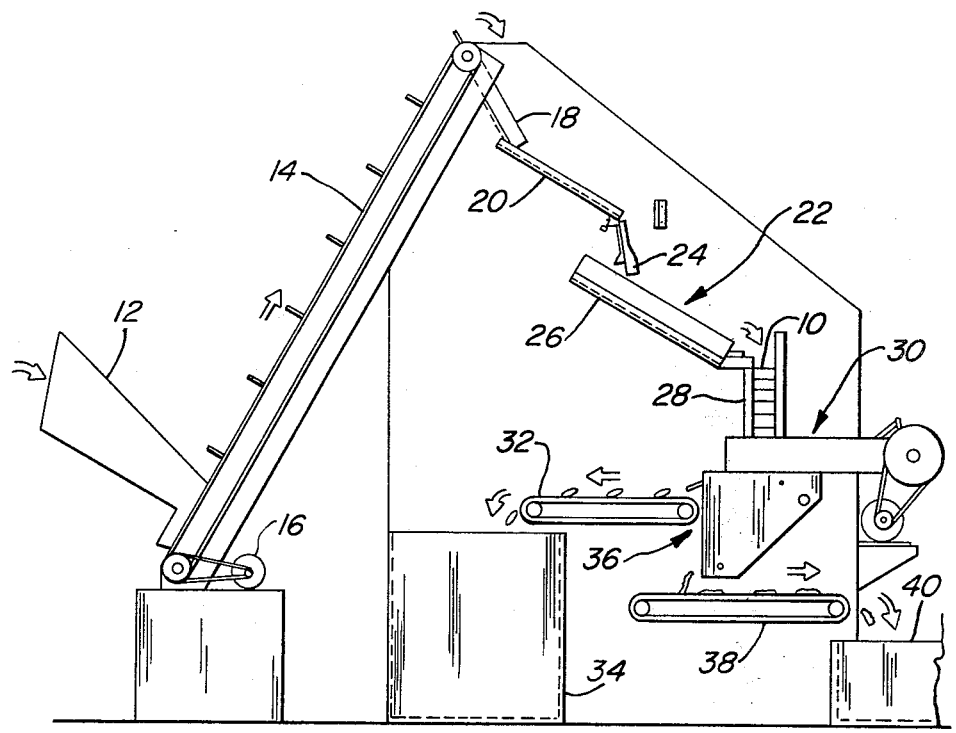
Fig.-1
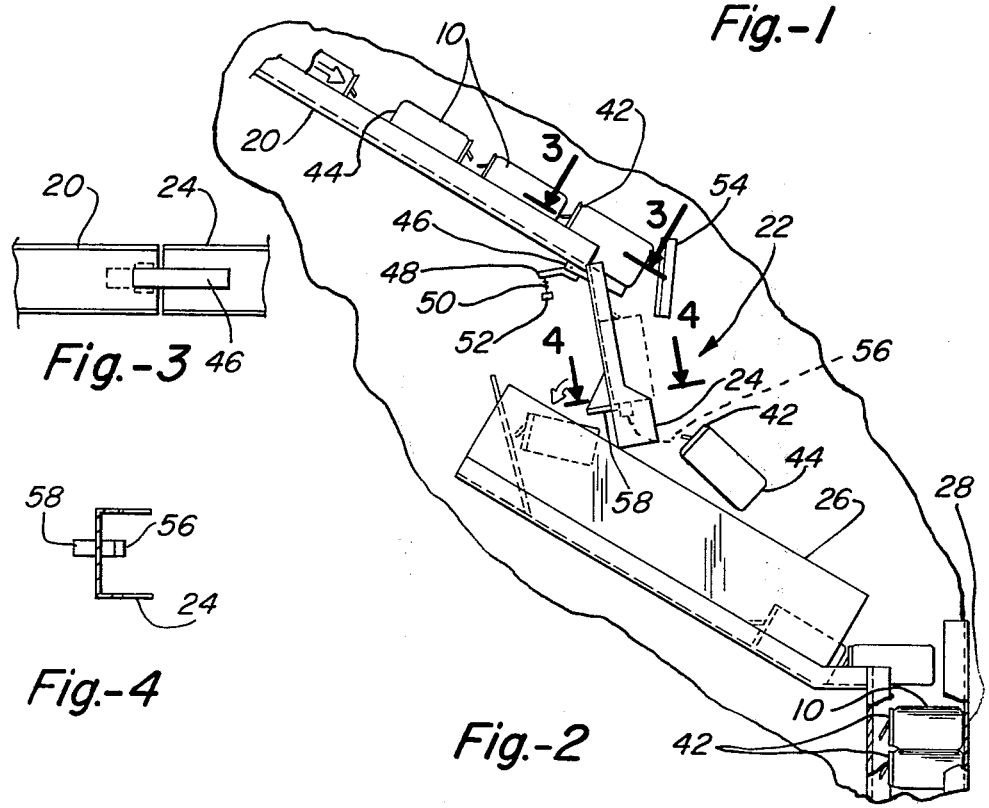
Fig.-3
Fig.-4
Fig.-2

METHOD AND APPARATUS FOR SEPARATING A LID FROM A CONTAINER

FIELD OF THE INVENTION

The present invention relates to apparatuses for removing lids from containers and, in particular, to an apparatus and method for removing aluminum lids from can bodies made of materials other than aluminum.

BACKGROUND ART

These is an increasing use of cans made of various metals, and proper disposal thereof has become a significant concern. In order to minimize littering of the cans and further reduce the consumption of energy and raw materials, it is advisable to re-use the materials from which the cans are made after the contents of the cans have been expended. With respect to cans made of different metals, it is usually necessary that the metals be separated before reprocessing or remelting of the cans is feasible. In the case of a beverage can having a steel body with tin plating, a steel lid and an aluminum lid, the aluminum lid must be removed prior to subsequent reprocessing of the remaining portions of the can. Failure to remove the aluminum and tin from the steel results in an important loss of those two metals when the steel is melted. Additionally, the presence of tin with the steel is normally unacceptable for proper reprocessing. Similarly, the aluminum cannot be successfully reprocessed without removal of the steel and tin.

Generally speaking, devices have been developed for recovering the different metals of cans by means of a crushing or a shredding operation, together with additional processing steps involving magnetic, electrostatic, inductive, screening, or density applications. As can be appreciated, these methods are cumbersome and expensive.

PRIOR ART STATEMENT

U.S. Pat. No. 3,618,429 to Froeliger discloses a drum cap removing tool wherein a plunger engages the cap and deforms the cap as the plunger moves in a direction outwardly to inwardly of the can. The tool includes radially-extendable jaws for grasping a bead of the cap while the plunger deforms the cap material. U.S. Pat. No. 3,736,896 to Osborn, Jr. et al., discloses a method for separating aluminum lids from cans formed of other metals utilizing different melting temperatures of the metals.

DISCLOSURE OF THE INVENTION

In accordance with the present invention, a multimetal container or can separating apparatus is provided. The apparatus includes a can orienting unit, a delidding unit, and a compacting unit for flattening the body of the can after the lid has been removed therefrom. Typically, the multi-metal can has a steel body with tin plating and an aluminum lid which is to be removed by the apparatus. The other end of the can is made of steel.

More particularly, a transporter feeds the cans to the can orienting unit. At the end of the transporter, a pivotable sequencer is attached to the transporter and extends therebeyond. A can overlying the sequencer causes it to pivot so that the end of the sequencer blocks the path of the next can. The can slides from the sequencer to an orienting chute of the orienting unit. The can moves down the orienting chute until the center of one of the can lids contacts a magnet connected to the orienting chute. The can then falls into a collection chute. The magnet orients can lids so that the steel lid is forward of the aluminum lid in the collection chute. Each can then has the steel lid forward of the aluminum lid for delivery to the delidding unit by means of a feed chute.

The delidding unit includes a pair of clamps which grip the periphery of the can prior to removing its aluminum lid. Cooperatively with the clamping of the can, a plunger body moves in a direction toward the can. A piercing element within the plunger body is extended to pierce and open the steel end of the can. The plunger continues its movement inside the can while the piercing element is retracted relative to and within the plunger body. The plunger body engages the aluminum lid of the can and, by means of the continued force applied to the lid by the plunger body, the lid is pushed from the can. The plunger body is then retracted back through and away from the can. The removed lid is received by a lid lid carrier transporting the lid to a conveniently located bin. The remaining can portion is released by the clamps and supported on a pivotable platform. The can following the just delidded can is supported by this delidded can until the clamps now surround this following can. Simultaneously with the moving of the plunger body towards the following can, the platform pivots so that the previously delidded can falls into a cavity formed between a wall of the compacting unit and a plate which is connected to and pivots with the platform. Simultaneously, with the retraction of the plunger body after delidding the following can, the platform returns to its original position for supporting another can. In so doing, the previously delidded can is flattened between the compacting unit wall and the plate.

In view of the foregoing general description of the invention, it is readily discerned that a number of worthwhile objectives are achieved. An apparatus is provided for quickly and efficiently separating a lid from a container after the container lid has been properly oriented. The apparatus has particular application in removing aluminum lids from steel body beverage cans. The apparatus pushes the lid from the can in a direction from inside the can to outside thereof eliminating the need for cumbersome and complicated mechanisms for engaging the can and the lid. The apparatus is capable of continuously and serially delidding a great number of cans while providing for the collection of the lids and the remaining can portions after they have been compacted. In addition, the present invention requires minimal power for operation and few operating personnel.

Additional advantages of the present invention will become readily apparent from the following discussion when taken in conjunction with the accompanying drawings.

BRIEF DESCRIPTION OF DRAWINGS

FIG. 1 is a side elevational view of an apparatus which includes the orienting unit, delidding unit and compacting unit of the present invention;

FIG. 2 is an enlarged, fragmentary view of the orienting unit of the present invention;

FIG. 3 is a fragmentary view, taken along lines 3—3 of FIG. 2, showing the sequencer of the present invention;

FIG. 4 is a lateral section, taken along lines 4—4 of FIG. 2, showing the magnet of the orienting unit;

DESCRIPTION OF THE PREFERRED EMBODIMENT

Figure 5:
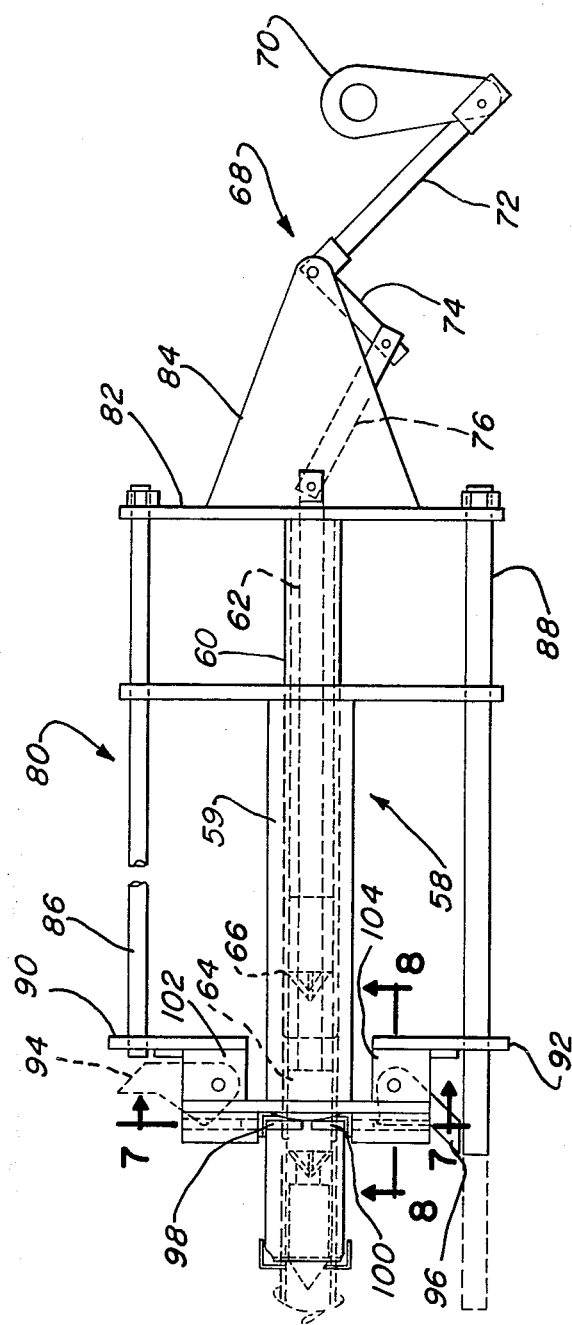
FIG. 5 is a top plan view showing the delidding unit of the present invention.

In accordance with the present invention, an apparatus for removing a lid from a container or can is provided. Typically, the lid or can end to be removed is made from a material different than the can body. In the preferred embodiment, an aluminum end or lid is removed from cans having a steel body portion and in which the other end or lid of the can it also made of steel.

FIG. 1 illustrates an apparatus for separating can lids which incorporates the features of the present invention. The cans 10 are fed by convenient means onto a hopper 12. The hopper 12 discharges the cans onto a conveyor 14 which is driven by a standard drive mechanism 16. The cans 10 exit the top end of the conveyor and are caught by a slide 18. The cans 10 are gravity fed to a transporter 20 from the slide member 18. Each can is serially carried along transporter 20 to an orienting unit 22. The orienting unit 22 includes an orienting chute 24, a collection chute 26, and a feed chute 28.

The orienting chute 24 receives the cans 10 from the transporter 20. The chute 24 then discharges the cans 10 so that each of the lids of the cans faces in a predetermined direction. The cans 10 leaving the orienting chute 24 are captured by the collection chute 26. The collection chute 26 delivers the cans 10 to a vertically extending feed chute 28.

The cans 10 are fed from the orienting unit 22 to a delidding unit 30. The delidding unit 30 removes the lid from each can as it is fed thereto. The removed lid is received by a can lid carrier 32 which transports the lid to a bin 34 which collects the can lids for temporary storage.

The remaining can portions, including the other lid of the can 10 and can body, fall to a compacting unit 36. The compacting unit 36 flattens the remaining can portions and releases the flattened can to a flattened can carrier 38. The carrier 38 transports the remaining can portions to a receptacle 40 for temporary storage.

Although not shown, it is readily understood that the foregoing process utilizes sensors at convenient locations for use in providing a synchronous flow of cans throughout the can lid separating system.

Reference is now made to FIGS. 2-9 for a more detailed description of the present invention. The orienting unit 22 is best seen in FIGS. 2-4. As depicted in FIG. 2, the transporter 20 conveys the cans 10 so that the longitudinal axis of each can 10 is parallel to the longitudinal axis of transporter 20. As a result of this arrangement of each of the cans 10, either a first can end 42 or a second can end 44 initially exits the transporter 20, followed by its can body and the other can end 42 or 44.

As also seen in FIG. 3, a sequencer 46 is pivotally connected to the end of the transporter 20 from which the cans 10 exit. Attached to the sequencer 46 is an arm 48 to which a spring 50 is fastened. A mass 52 is also connected to the spring 50. Each can 10, in turn, moves onto the sequencer 46. Because of the weight of the can 10, the sequencer 46 pivots and the can 10 falls therefrom. At the same time, the weight of the can 10 is causing the sequencer 46 to pivot, the next can 10, which is following the can 10 falling from the sequencer 46, is prevented from continuing its movement along the transporter 20. The end of the sequencer 46 adjacent the next can 10 is pivoted upwardly to block its path. After the can 10 on the sequencer 46 falls to the orienting chute 24, the force of the spring 50 permits the return of the sequencer 46 to its position substantially level with the transporter 20 so that the sequencer 46 receives the next can 10. The deflector 54 is provided adjacent the end of the transporter 20 to prevent the escape of cans 10 from the path of the orienting chute 24. In the foregoing manner, receipt of the cans 10 by the orienting chute 24 is delayed to permit proper orienting of each can 10 by the orienting unit 22.

Orienting of each of the cans 10 is required so that all of the corresponding can ends or lids face in a predetermined direction for delivery to the delidding unit 30. As previously mentioned, either a first end 42 or a second end 44 of each can 10 initially exits the transporter 20. In the preferred embodiment, the first can end 42 is made of aluminum while the second can end 44 is made of steel. The cans 10 move along the orienting chute 24 and one of the ends thereof is contacted by a magnetic member 56, as illustrated in FIGS. 2 and 4. Magnetic member 56 is connected to a plate 58 which is joined to the center of the orienting chute 24.

In those instances in which the steel end 44 of the can 10 contacts the magnetic member 56, an attracting force between the magnetic member 56 and the steel end 44, together with the downward movement of the can 10, causes the can 10 to turn or rotate about the magnetic member 56 through an arc of about 270°. This rotation of the can 10 results in the aluminum end 42 being relatively rearward of the steel end 44 (aluminum end 42 being located at the left side of the can 10 as seen in FIG. 2). The can 10 is captured by the collection chute 26 after this rotation and its release from the magnetic member 56. In order to assure that the can 10 is properly released by the magnetic member 56 whenever the steel end 44 engages the magnetic member 56, a projection (not shown in the drawings) can be connected to the orienting chute 24 below the magnetic member 56. When the can 10 rotates sufficiently to contact the projection, the projection acts to free the can 10 from the magnetic member 56.

In those instances in which the aluminum end 42 of the can 10 contacts the magnetic member 56, there is no attracting force between the magnetic member 56 and the aluminum end 42. Consequently, the downward movement of the can 10 causes the can 10 to tip or turn to the right about the aluminum end 42, as viewed with respect to FIG. 2. The can 10 turns or rotates through an arc of about 90°. The steel end 44 of the can 10 therefore is positioned forwardly of the aluminum end 42 of the can 10 and is then captured by the collection chute 26. In addition, although not shown in the drawings, an upwardly extending boss may also be supported by the magnetic member 56. In those instances in which the aluminum end 44 engages the magnetic member 56, the boss acts to divert or maintain the steel body portion of the can 10 away from the magnetic member 56 if the aluminum end 44 should move or fall immediately adjacent the magnetic member 56. As a result of this boss, the magnetic member 56 does not attract and hold the steel body portion of the can 10 in its downward movement toward collection chute 26.

Each of the cans 10 is received by the collection chute 26 having the first end 42 facing in a predetermined direction. In the preferred embodiment, the aluminum ends 42 of all of the cans 10 are rearward of the steel ends 44 or positioned to the left, as illustrated in FIG. 2. The oriented cans 10 are carried by means of gravity from the collection chute 26 to the feed chute 28. The vertically extending feed chute 28 maintains the can ends in proper alignment for delivery to the delidding unit 30.

Figure 6:
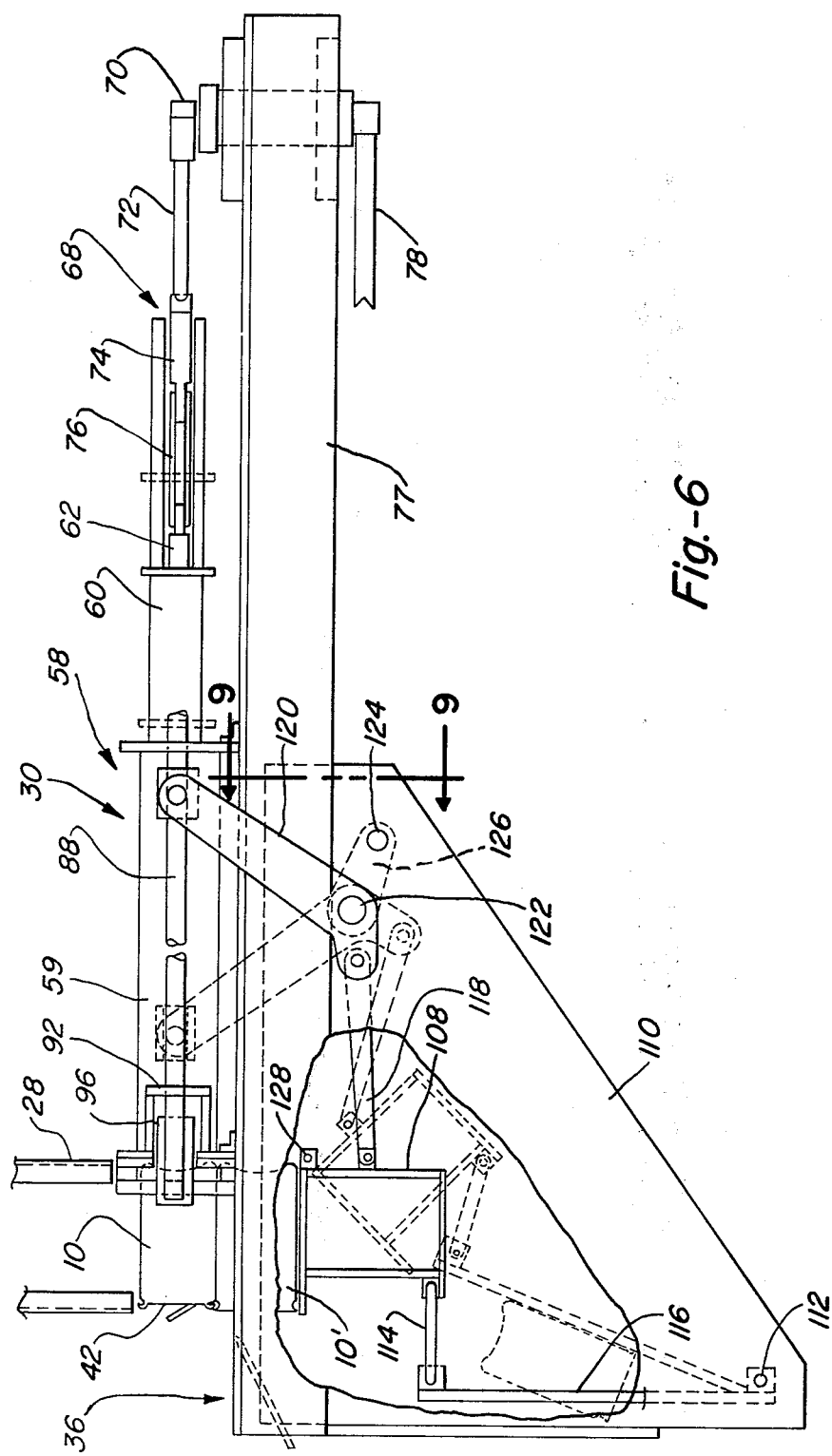
FIG. 6 is a side elevational view showing the delidding unit and compacting unit of the present invention.
Figure 7:
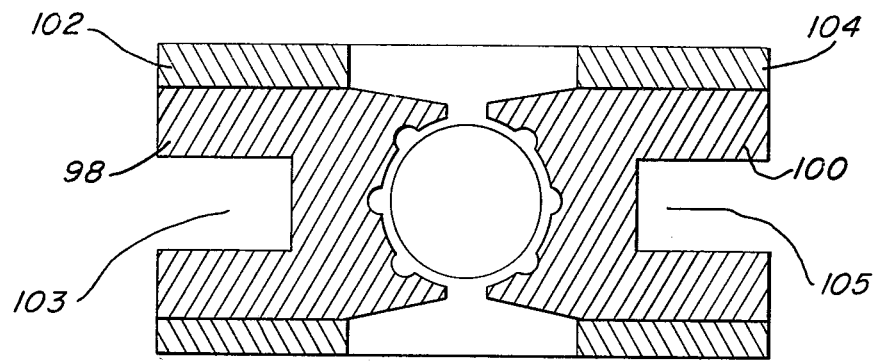
FIG. 7 is an enlarged, longitudinal section, taken along lines 7—7 of FIG. 5, showing the clamping members of the present invention.
Figure 8:
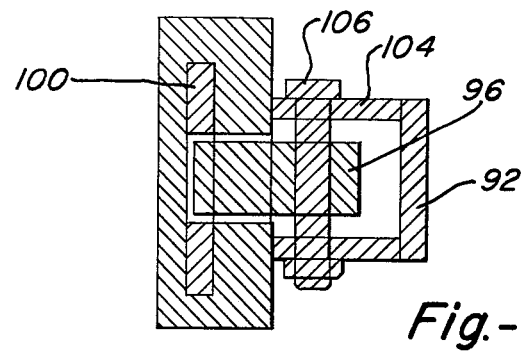
FIG. 8 is an enlarged, lateral section, taken along lines 8—8 of FIG. 5, showing details of the clamp assembly.

The delidding unit 30 is best seen in FIGS. 5 and 6. As depicted in FIG. 6, a can 10 exits the feed chute 28 and is positioned in axial alignment with a plunger assembly 58 of the delidding unit 30. In operation, a can 10 is initially supported by another can 10' wherein the first can end or lid 42 of can 10' has been removed by the delidding unit 30.

The plunger assembly 58 includes a tubular housing 59, a plunger body 60, a plunger rod 62, a plunger head 64, and a piercing end 66 (as indicated in FIG. 5). The plunger body 60 is movable within the stationary tubular housing 59. The plunger rod 62 is substantially surrounded by the plunger body 60. At a first end, the plunger rod 62 is connected to the plunger head 64. The piercing end 66 is joined to the plunger head 64. The plunger rod 62 is extendable and retractable relative to the plunger body 60.

The delidding unit 30 further includes a linkage assembly 68. The linkage assembly 68 includes a changing crank 70, a connecting rod 72, a first link member 74, and a second link member 76. The changing crank 70 is supported by a support stand 77 and is driven by a standard drive mechanism, which in the preferred embodiment includes a belt 78 connected to a motor (not shown). The changing crank 70 is coupled to the connecting rod 72 which in turn is joined to the first link member 74. The first link member 74 is fastened to the second link member 76 while the second link member is fastened to the plunger rod 62.

As shown in FIG. 5, the delidding unit 30 further includes a clamp assembly 80. The clamp assembly 80 includes a mounting plate 82, a pair of interconnecting members 84, a first rod 86, a second rod 88, coupling members 90, 92, a first clamping lever 94, a second clamping lever 96, a first clamping member 98, a second clamping member 100, and clamp housings 102, 104.

The interconnecting members 84 are located on opposite sides of the mounting plate 82 and join the clamp assembly 80 with the linkage assembly 68. Specifically, the interconnecting members 84 interconnect the first link member 74 and the mounting plate 82. The mounting plate 82 supports the first and second rods 86, 88 in spaced relation at an equal distance from the plunger body 60. First rod 86 is slidably supported at an end thereof in an opening formed in the coupling member 90 while second rod 88 is slidably supported at an end thereof in an opening formed in coupling member 92. The coupling members 90, 92 are connected to the stationary clamp housings 102, 104, respectively. As further illustrated in FIGS. 7 and 8, first clamping member 98 includes a slot 103 and second clamping member 100 includes a slot 105. Additionally, the clamp housing 102 supports first clamping lever 94 and first clamping member 98. The clamp housing 104 supports the second clamping lever 96 and the second clamping member 100. A clamp pin 106 is provided to fasten a clamping lever 94 or 96 to its corresponding clamp housing 102, 104.

Figure 9:
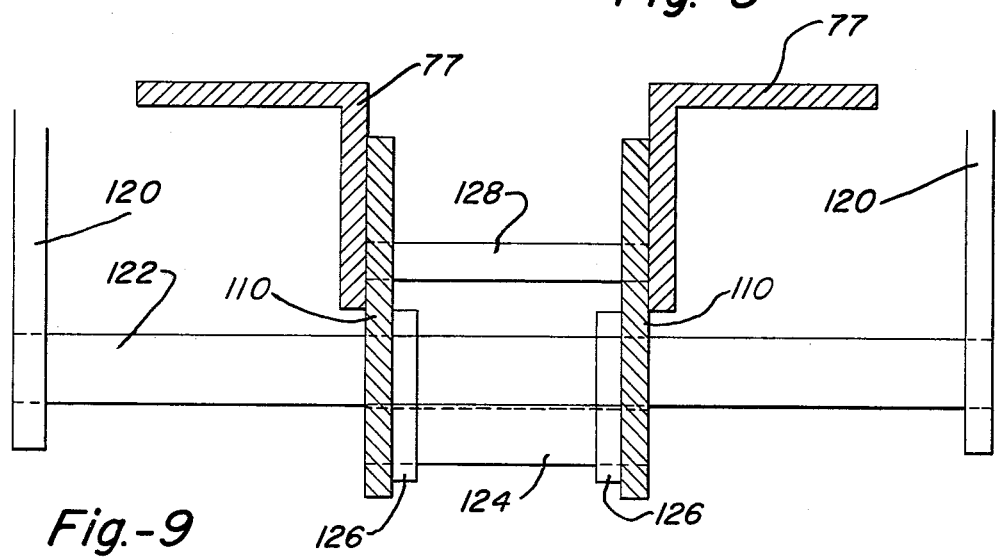
FIG. 9 is an enlarged, lateral section, taken along lines 9—9 of FIG. 6, showing further details of the compacting unit.

Inasmuch as the compacting unit 36 operates in conjunction with the delidding unit 30, the structure of the compacting unit 36 is now described. The compacting unit 36, as shown in FIGS. 6 and 9, includes a support platform 108 which is supported in a platform housing 110. The support platform 108 is pivotally connected at point 112 by means of bar 114 and compacting plate 116. Platform arms 118 are connected to the sides of the support platform 108 and extend laterally therefrom. The platform arms 118 are joined to first ends of pivot arms 120. Seconds ends of the pivot arms 120 are joined to the first rod 86 and second rod 88 of the delidding unit 30. Pivot pin 122 interconnects the pivot arms 120 and permits rotation or pivoting of the pivot arms 120 thereabout. Link arms 126 are attached to opposite ends of pivot pin 122 and each link arm 126 pivots about support pin 124. Support pin 124 is stationary and is provided together with link arms 126 to permit slight vertical movement of pivot pin 122 during rotation of the pivot arms 120.

The operation of the delidding unit 30 and compacting unit 36 can now be described. After feeding of a can 10 adjacent to and in axial alignment with the plunger body 60, the changing crank 70 is driven or rotated clockwise. FIG. 5 represents the position of the connecting rod 72, first link member 74 and second link member 76 when the piercing element 66 has just entered the second end 44 of the can 10.

At the same time the plunger rod 62 is extended or moved to the left, first rod 86 and second rod 88 are driven to the left through the connection provided by interconnecting members 84 to the linkage assembly 68. Each of the rods 86, 88 slidably moves relative to its coupling member 90, 92, respectively and engages its corresponding clamping lever 94, 96. Clamping lever 94 pivots because of the force applied thereto by first rod 86. Clamping lever 96 pivots because of the force applied thereto by second rod 88. As clamping lever 94 pivots, it moves into slot 103 and engages first clamping member 98 and drives or pushes it so that the first clamping member 98 engages circumferential portions of the can 10. Likewise, as second clamping lever 96 pivots, it moves into slot 105 and engages second clamping member 100 and drives or pushes it so that the second clamping member 100 engages other circumferential portions of the can 10.

The geometry of the linkage assembly 68, including the angles formed between the changing crank 70, connecting rod 72, first link member 74 and second link member 76 prior to moving the plunger rod 62 to the left, is structured so that the piercing end 66 is at its maximum movement or extension relative to the plunger body 60 when the piercing end 66 pierces or cuts into the second can end 44. When the piercing end 66 contacts the can second end 44, the piercing end 66 is extended beyond the end of the plunger body 60 so it is positioned to open this end of the can 10. As the changing crank 70 continues to be driven in a clockwise direction, the plunger rod 62 and piercing end 66 are retracted relative to the plunger body 60. That is, the plunger body 60 moves to the left, with reference to FIGS. 5 and 6, through the can 10 at a greater rate than the continued leftward movement of the plunger rod 62. When the plunger body 60 reaches the first end 42 of the can 10, the piercing end 66 is once again contained completely within the plunger body 60. As a result, the end of the plunger body 60 engages the first end 42 of the can 10. The force applied by the plunger body 60 in a direction inwardly to outwardly to the can 10 pushes or removes the first end 42 from the can 10. Upon removal of the can first end or lid 42, the plunger body 60 and plunger rod 62 are retracted to the right (as represented in FIGS. 5 and 6) through the action of the linkage assembly 68.

Simultaneously and in cooperation with the movement or extension of the plunger rod 62 relative to the plunger body 60, the pivot arms 120 are rotated about pivot pin 122 in a counter-clockwise direction. This rotation causes a pivoting of the support platform 108 (as illustrated in phantom lines) at pivot point 112 and about platform pin 128. As a consequence of the support platform 108 movement, the support for can 10′ is no longer present and can 10′ falls into a cavity formed between compacting plate 116 and one of the walls of the platform housing 110.

It is readily understood that the first end 42 of can 10′ was previously removed by the delidding unit 30. It is also understood that the pivoting movement of the support platform 108 cooperates with the movement of the clamping members 98, 100 such that the support platform 108 supports can 10′ until the clamping members 98, 100 firmly engage can 10 so that can 10 need no longer be supported by can 10′.

After can 10 has been delidded, retraction or movement to the right of the plunger body 60 causes a clockwise rotation of pivot arms 120. Consequently, support platform 108 is moved to its original upright position in order to support the delidded can 10 when it is released by the clamping members 98, 100. As the support platform 108 returns to its upright position, flattening of can 10′ occurs between compacting plate 116 and a wall of the platform housing 110. In order to assure that clamping members 98, 100 disengage each of the cans 10 after removal of the first end 42 thereof, a biasing force is provided. In one embodiment (not depicted in the drawings), a spring under compression surrounds a rod. The rod is supported at opposite ends thereof in openings formed in a pair of triangular plates. One plate is fastened to clamping member 98 while the other plate is fastened to clamping member 100. The spring is under compression so that, when the clamping levers 94, 96 engage the clamping members 98, 100, respectively, the clamping members 98, 100 are driven against the force of the spring to surround the can 10. When the clamping levers 94, 96 return to their initial position and are no longer engaged by first rod 86 and second rod 88, the force of the compressed spring urges the clamping members 98, 100 away from the delidded can 10.

The above process is continued for each of the cans 10. The first ends or lids 42 of the cans 10 are received by the can lid carrier 32 while the remaining flattened portions of the cans 10 are received by the flattened can carrier 38.

In view of the foregoing detailed description, it is readily seen that a number of worthwhile objectives and advantages have been achieved by the method and apparatus of the present invention. A method of removing a can lid is disclosed in which the lid is removed by applying a force thereto from within the can itself. The apparatus removes can lids in such a manner so that large numbers of cans can be delidded quickly and efficiently. The apparatus orients each can so that lids made from a predetermined material all face in the same direction. Each lid made from the predetermined material is removed from the can while the remaining portions of the can are flattened. The delidding unit and compacting unit of the present invention cooperate such that at the same time a plunger body is retracted after removing a can lid, a previously delidded can is flattened.

Although the present invention has been described with reference to a particular embodiment thereof, it is readily appreciated that variations and modifications can be effected within the spirit and scope of this invention.

What is claimed is:

1. A method for removing a first end of a container, comprising the steps of:
    entering a second end of the container; and
    applying a force to the first end of the container in a direction inwardly to outwardly of the container to remove the first end of the container.

2. A method, as claimed in claim 1, further including the step of:
    securing the container in a relatively fixed position.

3. A method for removing a first end of a container using plunger means including retractable opening means and plunger body means, comprising the steps of:
    opening a second end of the container using said opening means;
    retracting said opening means within said plunger body means; and
    removing a first end of the container using said plunger body means.

4. A method for removing an end of a container using plunger means including retractable opening means and plunger body means, comprising the steps of:
    extending said opening means relative to said plunger body means;
    holding the container in a relatively fixed position simultaneously with the extending of said opening means;
    opening one end of the container using said opening means;
    retracting said opening means within said plunger body means; and
    removing another end of the container using said plunger body means.

5. An apparatus for removing a container first end comprising:
    first means for entering the container through a second end thereof and for removing the first end of the container while moving in a direction inwardly to outwardly of the container; and
    second means for moving said first means.

6. An apparatus, as claimed in claim 5, further including;
    third means responsive to said second means for holding the container during the removing of the container first end.

7. An apparatus for removing an end of a container, comprising:
    plunger means for removing a container first end, said plunger means including opening means for opening a container second end and plunger body means for housing said opening means, said opening means being extendable and retractable relative to said plunger body means; and drive means for moving said plunger means in a direction such that the container first end is removed after an opening is provided by said plunger means in the container second end.

8. An apparatus, as claimed in claim 7, wherein said drive means includes:

motor means; and linkage means connected to said motor means, said linkage means being connected to said opening means and said plunger body means, said linkage means for enabling movement of said opening means relative to the movement of said plunger body means.

9. An apparatus, as claimed in claim 8, further including:

clamping means connected to said linkage means for holding the container, said clamping means engaging the container during movement of said plunger means in a first direction and disengaging the container during movement of said plunger means in a second direction.

10. An apparatus, as claimed in claim 9, wherein said clamping means includes:

a first clamping member for engaging a first circumferential portion of the container;

a second clamping member for engaging a second circumferential portion of the container;

a first clamping lever operatively responsive to said drive means for engaging said first clamping member; and a second clamping lever operatively responsive to said drive means for engaging said second clamping member.

11. An apparatus, as claimed in claim 7, wherein said opening means includes:

a piercing end for opening the container second end;

a piercing rod connected to said piercing end and said drive means.

12. An apparatus, as claimed in claim 8, wherein:

said linkage means includes a first link member and a second link member pivotally connected to said first link member, said first link member and said second link member defining a predetermined angle when said opening means is extended for opening the second end of the container.

* * * * *